United States Patent [19]

Fries

[11] Patent Number: 5,500,126
[45] Date of Patent: Mar. 19, 1996

[54] PROCESS FOR REMOVAL OF METAL IONS FROM AQUEOUS SOLUTIONS

[75] Inventor: William Fries, Southampton, Pa.

[73] Assignee: Rohm and Haas Company, Phila., Pa.

[21] Appl. No.: 326,443

[22] Filed: Oct. 20, 1994

[51] Int. Cl.$^6$ .............................. B01D 15/04; C02F 1/42
[52] U.S. Cl. .................. 210/668; 210/669; 210/688; 204/DIG. 13; 423/24; 423/DIG. 14
[58] Field of Search .................... 210/666, 668, 210/669, 688; 204/232–238, 240, 241, DIG. 13, 235; 75/635, 417, 713; 423/24, DIG. 14

[56] References Cited

U.S. PATENT DOCUMENTS

| | | | |
|---|---|---|---|
| 3,984,314 | 10/1976 | Fries | 210/684 |
| 4,167,481 | 9/1979 | Cremers et al. | 210/36 |
| 5,108,615 | 4/1992 | Hosea et al. | 210/668 |
| 5,443,736 | 8/1995 | Szmanda et al. | 210/668 |

*Primary Examiner*—Cynthia L. Nessler
*Attorney, Agent, or Firm*—Thomas J. Howell

[57] ABSTRACT

An improved process for removal of metal ions from aqueous solutions is disclosed. Removal of metal ions from aqueous solution, particularly from metal plating waste streams, is achieved by the combined use of polyamines, at levels less than the stoichiometric amount of metal ion, and cation exchangers. Treatment of waste streams with low levels of triethylenetetramine followed by contact with a strong acid cation exchange resin is especially effective in the removal of copper from metal-containing waste streams.

8 Claims, No Drawings

PROCESS FOR REMOVAL OF METAL IONS FROM AQUEOUS SOLUTIONS

BACKGROUND

The present invention relates to an improved process for removal of metal ions from aqueous solutions. In particular the present invention relates to the use of polyamines and cation exchange resins to remove metal ions from metal-plating and metal-finishing waste streams.

In the process of electroless metal plating it is desirable to maintain a high concentration of the metal ion in solution for plating onto a substrate. This is achieved by solubilizing normally insoluble metal ions, such as copper and nickel, as their metal complexes under neutral or basic conditions.

It has been recognized in electroless metal plating processes that using an excess of a chelating or complexing agent, such as ethylenediaminetetraacetic acid (EDTA), maintains the solubility of the metal ions so that undesirable deposition and precipitation do not occur during the process. However, removal of low-level concentrations of the metal ions from process waste streams is rendered difficult and often impractical due to the stability of the metal complexes formed during the plating process. Anion exchange resins have been used to adsorb the negatively charged metal ion complexes from used plating solutions; however, the background concentration of excess competing anions, such as sulfate, and excess complexing agent, are usually more readily adsorbed by the anion exchange resins and the effective capacity of such resins for the metal ion complex is relatively low causing incomplete removal of metal ions from these solutions.

Low-level concentrations of residual metal ions in waste streams from metal-finishing and electroplating operations pose a significant environmental problem due to the toxic nature of many of the metal ions if they contaminate groundwater systems that are used by wildlife or human populations. It is, therefore, desirable to minimize contamination of water systems by metal ions, and there is a need for an economical and efficient method for removal of metal ions from waste streams containing low-level metal concentrations.

A variety of methods have been employed to address the problem of removing metal ions from metal-process waste streams. For example, U.S. Pat. No. 4,167,481 discloses a process for removing metal ions from aqueous solutions by using polyamines in amounts greater than the stoichiometric amount of metal ion in the waste streams to enhance the adsorption of the metal ions onto cation exchange materials. However, the high use levels required for the polyamines themselves present additional disposal problems.

The methods of the prior art suffer from incomplete removal of metal ions using anion exchange resins or require high levels of polyamine additives to increase the efficiency of cation exchange materials for removing metal ions. These approaches increase the cost and complexity of treating the waste streams from metal-working and metal-plating processes and may require additional treatment. The present invention seeks to overcome the problems of the prior art by providing an improved process for removing metal ions from aqueous solutions.

STATEMENT OF INVENTION

The present invention provides a process for removal of metal ions from aqueous solutions that comprises (a) adding a polyamine to an aqueous solution containing metal ions and a metal complexing agent capable of forming a metal-complex with the metal ions, the complexing agent being present in greater than equimolar amount with respect to metal ion concentration, the polyamine being added in equimolar or less than equimolar amount with respect to metal ion concentration, the amount of polyamine being effective to release the metal ions from the metal-complex, and (b) contacting the aqueous solution from step (a) with a cation exchanger.

The present invention further provides a process for removal of metal ions from aqueous solutions that comprises (a) adding triethylenetetramine to an aqueous solution containing copper ions and a metal complexing agent capable of forming a metal-complex with the copper ions, the complexing agent being present in greater than equimolar amount with respect to copper ion concentration, the triethylenetetramine being added in an amount from 0.1 to 0.5 times the copper ion concentration, and (b) contacting the aqueous solution from step (a) with a strong acid cation exchange resin.

In other embodiments the present invention provides the processes described above wherein step (b) further comprises the presence of a strong base anion exchange resin.

DETAILED DESCRIPTION

The process of the present invention is applicable to the removal of metal ions from aqueous solutions containing the complexed metal ions in the presence of excess complexing agent. Typical metal-plating or metal-finishing processes involve use of an excess of strong complexing agents to solubilize heavy metal ions, such as $Hg^{2+}$, $Co^{2+}$, $Ag^+$, $Pb^{2+}$, $Fe^{3+}$, $Sn^{2+}$, $Cu^{2+}$, $Ni^{2+}$, $Cd^{2+}$, $Zn^{2+}$ and $Cr^{3+}$. These methods are well known to those skilled in the art of metal-plating or metal-finishing processes.

Metal ions susceptible to treatment by the present invention include those that form complexes with complexing agents and also with polyamines. Preferably, metal ions treated by the process of the present invention are one or more of mercury, cobalt, silver, lead, iron, tin, copper, nickel, cadmium, zinc or chromium ions; more preferably, the metal ions are one or more of copper, mercury, cadmium, zinc or chromium ions; and most preferably, the metal ions are those of copper.

Complexing agents used to maintain solubility of metals in aqueous solutions include, for example, one or more of ethylenediaminetetraacetic acid (EDTA), diethylenetriaminepentaacetic acid (DTPA), N-(2-hydroxyethyl)ethylenediaminetriacetic acid or nitriloacetic acid (NTA). Typically, the pH of the solutions is adjusted to convert at least some of the complexing agent to corresponding salt forms, for example, neutral or basic pH conditions.

As used herein, the term "ratio" of amounts of two materials (for example, [complexing agent]/[metal]) means the ratio of their molar concentrations in the aqueous solution, unless otherwise indicated. The term "metal ion concentration" means the total metal ion molar concentration (moles/liter) in solution, that is, both complexed and uncomplexed forms, unless otherwise indicated. In the process of the present invention, the metal ions may be present in aqueous solution in several forms, for example, copper may be in the form of $Cu^{2+}$ associated with sulfate counterion, in the form of a copper-EDTA complex ion or in the form of a copper-polyamine complex ion, depending upon conditions.

Polyamines useful in the present invention include, for example, ethylenediamine (EDA), propylenediamine, diethylenetriamine (DETA), triethylenetetramine (TETA), tetraethylenepentamine (TEPA), hexamethyltriethylenetetramine, tris(2-(N,N-dimethyl)aminoethyl)amine and tris(2-aminoethyl)amine. Preferably, the polyamine is one or more of diethylenetriamine, triethylenetetramine or tetraethylenepentamine. Triethylenetetramine is a particularly preferred polyamine compound of the present invention due to its high metal ion removal efficiency at low polyamine use levels, for example, at 0.1 to 0.5 times the metal ion concentration.

Cation exchangers useful in the present invention include, for example, cation exchange resins based on crosslinked organic polymers and other cation exchange materials, such as aluminosilicates (for example, zeolites, montmorillonite and bentonite). Useful cation exchange resins include, for example, sulfonated crosslinked polystyrene (strong acid cation exchange resin), alkylaminophosphonate functionalized crosslinked polystyrene (phosphonate cation exchange resin), iminodiacetate functionalized crosslinked polystyrene (iminodiacetate cation exchange resin) and crosslinked polymethacrylic acid (weak acid cation exchange resin). Preferably, the cation exchange resin is one or more of a strong acid, a phosphonate, an iminodiacetate or a weak acid cation exchange resin. The use of a strong acid cation exchange resin is most preferred.

The discovery that polyamine compounds may be used to enhance the capacity of cation exchangers for metal ions where the polyamine is used in equimolar or less than equimolar amount with respect to the metal ion concentration is surprising; teachings of the prior art (U.S. Pat. No. 4,167,481) require greater than equimolar amounts of polyamine compounds for successful removal of metal ions from aqueous solutions. The concentration of polyamine compound used in the present invention is preferably from 0.01 to 0.99 times the metal ion concentration, more preferably from 0.1 to 0.9 times the metal ion concentration, and most preferably from 0.1 to 0.5 times the metal ion concentration.

Processing of the aqueous solutions after treatment with polyamine includes, for example, static (equilibrium) or dynamic (equilibrium or non-equilibrium) processes using ion exchangers to remove the metal ions from the aqueous solutions. For example, ion exchange resin may be added to a container of used metal plating solution followed by agitation for a sufficient time to achieve saturation of the resin. The latter is an example of a batch or static equilibrium process. A non-batch or dynamic equilibrium process also may be used, for example, where the used metal plating solution is passed through an ion exchange resin column until the resin is saturated with metal ion. In this case, the resin is treated with metal plating solution until the concentration of metal ion in the effluent equals the concentration of metal ion of the influent and the theoretical capacity of the resin for the particular metal ion is most closely approached.

Preferably, a dynamic non-equilibrium process is used, for example, where the used metal plating solution is passed through an ion exchange column at high flow rates, for example, about 5–10 bed volumes per hour (BV/hr), until some predetermined level (breakthrough) of metal ion is detected in the effluent; in this case, significantly less than the theoretical capacity of the ion exchange resin for the particular metal may be achieved.

Other variations of treating metal-containing waste streams include, for example, use of a "slip" stream recycle or using batch mode pretreatment followed by a finish-off "polishing" step. The "slip" stream variation involves continuously recycling the treated effluent from the cation resin back to the original metal waste stream source to maintain the metal ion concentration below some predetermined level; when the cation resin is exhausted, the waste stream is diverted to a fresh cation resin and exhausted resin is regenerated for reuse. The pretreat/polishing variation involves an initial batch treatment to remove the bulk of the metal ion concentration, followed by a polishing process using one of the aforementioned methods to remove the last traces of metal.

Conditions encountered with specific metal-containing waste streams contribute to the selection of cation exchanger and the general operating parameters used for removal of metal ions from aqueous solutions. For example, the magnitude of the capacity of cation exchangers for metal ions and the degree of enhancement of this capacity using the process of the present invention will be dependent on the particular metal ion, complexing agent, polyamine and cation exchanger involved, and whether equilibrium or non-equilibrium cation exchanger loading conditions are used.

Aqueous solutions that have been treated by the process of the present invention contain only a small fraction of the metal present in the original solutions and the treated solutions may be discharged into sewer or surface waters systems or further processed to recover other components of interest.

In a preferred embodiment of the invention, a mixture of cation exchange resin and anion exchange resin (known as "mixed bed") is used to remove the metal ions after treatment of the aqueous solution with polyamine. Preferably, volume/volume ratios of cation exchange resin to anion exchange resin are from 10/1 to 1/10 and more preferably from 3/1 to 1/3. Use of the cation exchange/anion exchange resin mixture has been found to be unexpectedly beneficial, especially when used under dynamic non-equilibrium conditions in the presence of high ratios of complexing agent to metal ion, for example, when $[EDTA]/[Cu^{2+}]$ is greater than about 2 or 3.

The ion exchange resin capacity for copper ions is increased at least 5 to 10 times if an amount of anion exchange resin is used together with the cation exchange resin when treating a copper containing solution under dynamic non-equilibrium conditions and the polyamine is present in less than equimolar amount with respect to metal ion concentration. For example, at a $[polyamine]/[Cu^{2+}]$ ratio of 0.5 (see Example 5), the capacity of the mixed bed increases from substantially non-detectable (limit of detection of 2 milligrams copper/gram (mg Cu/g) wet resin) to 4–11 mg Cu/g wet resin at mixed bed resin compositions ranging from 1/3 to 3/1 volume cation exchange resin/ volume anion exchange resin. The effectiveness of less than stoichiometric amounts of polyamine under these conditions is surprising since prior art methods require greater than equimolar amounts of polyamine with respect to metal ion concentration to enhance the capacity of cation exchangers for metal ions.

A typical electroless copper waste stream may contain, for example, 100 to about 1000 parts per million by weight (ppm) $Cu^{2+}$ metal, in the form of copper sulfate, with a 2 to 10 molar excess of complexing agent, such as EDTA ($[EDTA]/[Cu^{2+}]$ ratio= 2–10) at a pH of 10–11. Prior art methods typically use an anion exchange resin, such as Amberlite™ IRA-400 (strong base quaternary ammonium form), to remove metal ions (in metal-complex form) from the copper waste stream. The copper capacity of anion exchange resins used under equilibrium conditions is typically 0.5–2 mg Cu/g wet resin (see Example 3). The copper capacity of cation exchange resins (in the absence of polyamine) is typically less than 2 to about 20 mg Cu/g (see Examples) wet resin depending upon whether equilibrium or non-equilibrium resin loading conditions are used.

Some embodiments of the invention are described in detail in the following Examples. All ratios, parts and percentages are expressed by weight unless otherwise specified, and all reagents used are of good commercial quality unless otherwise specified.

EXAMPLE 1

A synthetic electroless-copper aqueous waste stream was prepared containing 300 ppm $Cu^{2+}$, as metal, in the form of copper sulfate, with a six-fold or three-fold molar excess of EDTA ([EDTA]/[$Cu^{2+}$] ratio= 6.0 or 3.0) at a pH of 10.0. Samples were prepared using the above synthetic waste stream, representing different levels of polyamine relative to copper concentration. The polyamine used was TETA and the [TETA]/[$Cu^{2+}$] ratios ranged from 0.0 (no polyamine) to 6.0. One gram samples of wet ion exchange resin were placed in sintered glass tubes and the different synthetic copper waste streams were passed through the beds of different cation exchange resins until equilibrium (saturation) was achieved, i.e., effluent copper concentration equaled influent copper concentration. About 1-liter of synthetic copper waste stream was passed through each resin sample at a rate of about 20 milliliters/hour for 48 hours. Each cation exchange resin was then rinsed free of excess influent solution and eluted with 1N HCl to remove bound copper; copper concentration of the eluent was analyzed by DCP (decoupled plasma) atomic emission spectroscopy. The copper capacity of each resin was then calculated as mg Cu/g wet resin. The cation exchange resins used were commercial resins available from Rohm and Haas Co.: iminodiacetate resin (Amberlite™ IRC-718), weak acid resin (Amberlite™ DP-1) and strong acid resin (Amberlite™ IR-122). Data are presented in Table I.

At equimolar or less than equimolar ratios of [TETA]/[$Cu^{2+}$] the cation exchange resins show enhanced copper capacity compared to the resin capacities in the absence of polyamine. For comparison, the [TETA]/[$Cu^{2+}$] ratios of 2.0 and 6.0 (greater than equimolar [polyamine]/[metal]) and 0.0 (no polyamine) are shown to represent conditions of the prior art.

TABLE 1

| [TETA]/[$Cu^{2+}$] Molar Ratio | Copper Capacity (mg Cu/g wet resin) (Cation Exchange Resin Type | | |
|---|---|---|---|
| | Iminodiacetate | Weak Acid | Strong Acid |
| 6.0  | 11 (15) | 19 (25) | 12 (49) |
| 2.0  | 16 (19) | 22 (28) | 44 (48) |
| 1.0  | 12 (24) | 15 (33) | 31 (61) |
| 0.5  | 17 (24) | 19 (36) | 51 (57) |
| 0.1  | 11 (13) | 6 (11)  | 26 (28) |
| 0.03 | 7       | 2       | 21      |
| 0.0  | 6 (7)   | 0 (0)   | 13 (19) |

( ) conducted at [EDTA]/[$Cu^{2+}$] = 3, all other data at [EDTA]/[$Cu^{2+}$] = 6

EXAMPLE 2

A synthetic electroless-copper aqueous waste stream was prepared containing 39 ppm $Cu^{2+}$, as metal, in the form of copper sulfate, with a six-fold molar excess of EDTA ([EDTA]/[$Cu^{2+}$] ratio= 6) at a pH of 10.2. The general procedure of Example 1 was repeated using different polyamines at [polyamine]/[$Cu^{2+}$] ratios equivalent to 0.10 for TETA. The polyamines evaluated were ethylenediamine (EDA), diethylenetriamine (DETA), TETA and tetraethylenepentamine (TEPA). For comparison, ammonia ($NH_3$) and "no polyamine" conditions were also included. The polyamine "nitrogen" to $Cu^{2+}$ ratio was held constant at 0.4, for example, DETA was used at a [polyamine]/[$Cu^{2+}$] ratio of (4/3)×0.1 or 0.13, EDA at 0.20, $NH_3$ at 0.40, and TEPA at 0.08. The ion exchange resins used in addition to those described in Example 1 were commercial resins available from Rohm and Haas Co.: phosphonate type (Duolite™ C-467) and strong base anion type (Amberlite™ IRA-400). Data are presented in Table 2. Of the polyamines used to enhance the removal of copper ions from the synthetic waste stream under the conditions tested, TETA was the most efficient with regard to amine nitrogen content.

TABLE 2

| Polyamine | ["Nitrogen"]/[$Cu^{2+}$] Molar Ratio | Copper Capacity (mg Cu/g wet resin) (Ion Exchange Resin Type) | | | | |
|---|---|---|---|---|---|---|
| | | Imino-diacetate | Weak Acid | Strong Acid | Phosphonate | Strong Base Anion |
| none | —   | 4    | 0    | 3   | 0   | 1   |
| $NH_3$ | 0.4 | 7    | 0    | 7.5 | 0   | 0.5 |
| EDA  | 0.4 | 5    | 0    | 4   | 0   | 1   |
| DETA | 0.4 | 10   | 4    | 21  | 1   | 1   |
| TETA | 0.4 | 17   | 22   | 44  | 4.5 | 0.5 |
| TEPA | 0.4 | 9.5  | 11.5 | 37  | 3   | 1   |

EXAMPLE 3

Cation exchange resin capacities for copper under equilibrium conditions were determined using the resins described in Example 2. The general conditions of Example 2 were repeated (39 ppm $Cu^{2+}$, [EDTA]/[$Cu^{2+}$]=6, pH of 10.2) except that only TETA was used as the polyamine at different [TETA]/[$Cu^{2+}$] ratios. Data are presented in Table 3. At less than equimolar ratios of [TETA]/[Cu2+], all of the cation exchange resins tested showed enhanced copper capacity compared to the resin capacities in the absence of polyamine. For comparison, [polyamine]/[metal] ratios of 3 (greater than equimolar [polyamine]/[metal]) and 0.0 (no polyamine) are shown to represent conditions of the prior art; the strong base anion resin data are also representative of prior art methods.

TABLE 3

| [TETA]/ [Cu$^{2+}$] Molar Ratio | Copper Capacity (mg Cu/g wet resin) (Ion Exchange Resin Type) | | | | |
|---|---|---|---|---|---|
| | Imino-diacetate | Weak Acid | Strong Acid | Phos-phonate | Strong Base Anion |
| 3 | 3 | 4 | 32 | 1 | 0.1 |
| 0.5 | 19 | 29 | 44 | 7 | 0.2 |
| 0.1 | 17 | 22 | 44 | 4.5 | 0.5 |
| 0.03 | 13 | 10 | 28 | 3 | 2 |
| 0.0 | 4 | 0.1 | 3 | 0.1 | 1 |

EXAMPLE 4

Dynamic non-equilibrium ion exchange column conditions were used to determine the effectiveness of polyamine in enhancing the removal of metal ions using strong acid sulfonate type ion exchange resin. A synthetic electroless-copper aqueous waste stream was prepared containing 500 ppm Cu$^{2+}$, as metal, in the form of copper sulfate, with an [EDTA]/[Cu$^{2+}$] ratio of 6.0 at a pH of 10.2. Different levels of TETA were used representing [TETA]/[Cu2+]ratios from 0.03 to 24.0 and the different formulations were passed through a column of sulfonate type ion exchange resin (Amberlite™ IR-120 available from Rohm and Haas Co.) at approximately 8 BV/hr until a 10% leakage endpoint was reached. The 10% leakage endpoint corresponded to a buildup to 50 ppm Cu$^{2+}$ in the effluent. The copper ion capacity of the resin at each set of conditions was then calculated as mg Cu/g wet resin. Data are presented in Table 4.

These data show that [TETA]/[Cu$^{2+}$] ratios greater than one are required under dynamic non-equilibrium conditions in order to effect the release of Cu$^{2+}$ at high [EDTA]/[Cu$^{2+}$] ratios using a strong acid cation exchange resin. The cation exchange resin had a very low capacity for retaining Cu$^{2+}$ at the flow rate used for these non-equilibrium conditions, resulting in rapid buildup of Cu$^{2+}$ in the treated effluent unless there was an excess of TETA relative to Cu$^{2+}$ and EDTA concentrations. For comparison, [TETA]/[Cu$^{2+}$] ratios of 6, 12, and 24 (greater than equimolar [polyamine]/[metal]) and 0.0 (no polyamine) are shown to represent conditions of the prior art.

TABLE 4

| [TETA]/[Cu$^{2+}$] Molar Ratio | Copper Capacity (mg Cu/g wet resin) |
|---|---|
| 0.0 | <<2 |
| 0.03 | <<2 |
| 0.10 | <<2 |
| 0.30 | <<2 |
| 0.50 | <<2 |
| 1.0 | <<2 |
| 6.0 | 38 |
| 12.0 | 38 |
| 24.0 | 38 |

EXAMPLE 5

Using dynamic non-equilibrium ion exchange column conditions similar to that used in Example 4, a stoichiometric deficiency of TETA relative to Cu$^{2+}$ or EDTA was evaluated using a mixed bed ion exchange system: strong acid cation type (Amberlite™ IR-120) plus a strong base quaternary ammonium anion type (Amberlite™ IRA-400). A synthetic electroless-copper aqueous waste stream was prepared containing 500 ppm Cu$^{2+}$, as metal, in the form of copper sulfate, with an [EDTA]/[Cu$^{2+}$] ratio of 6.0 and a TETA]/[Cu$^{2+}$] ratio of 0.5 at a pH of 10.0 or 4.0. The solution was passed through different combinations (volume/volume) of mixed bed strong acid cation/strong base anion type resins at approximately 8 BV/hr until a 10% leakage endpoint was reached. The copper ion capacities of the mixed bed resin mixtures were then calculated as mg Cu/g wet resin. Data are presented in Table 5.

TABLE 5

| Mixed Bed Ion Exchange Resin Mixture | Copper Capacity (mg Cu/g wet resin) | |
|---|---|---|
| (volume/volume) | pH = 10 | pH = 4.0 |
| 100% strong acid | <<2 | <<2 |
| 75% strong acid/ 25% strong base anion | 4.5 | 2.5 |
| 50% strong acid/ 50% strong base anion | 5 | 5 |
| 25% strong acid/ 75% strong base anion | 11 | 7 |

The results of this experiment show that using a mixed bed ion exchange resin system containing some amount of anion exchange resin allows less than stoichiometric amounts of TETA to be used relative to EDTA or Cu$^{2+}$ under dynamic non-equilibrium conditions to effect the release of copper ions at high [EDTA]/[Cu$^{2+}$] ratios. If the assumption is made that the strong base anion resin has a maximum capacity of about 2 mg Cu/g wet anion resin, then the "calculated" capacity of the strong acid resin alone is approximately 35–40 mg Cu/g wet cation resin at the 25/75 strong acid/strong base resin ratio (pH of 10).

I claim:

1. A process for removal of metal ions from aqueous solutions that comprises:

(a) adding a polyamine to an aqueous solution containing metal ions and a metal complexing agent capable of forming a metal-complex with the metal ions, the complexing agent being present in greater than equimolar amount with respect to metal ion concentration, the polyamine being added in an amount from 0.1 to 0.5 times the metal concentration, the amount of polyamine being effective to release the metal ions from the metal-complex; and (b) contacting the aqueous solution from step (a) with a cation exchanger.

2. The process of claim 1 wherein the polyamine is one or more of diethylenetriamine, triethylenetetramine or tetraethylenepentamine.

3. The process of claim 1 wherein the metal ion is one or more of mercury, cobalt, silver, lead, iron, tin, copper, nickel, cadmium, zinc or chromium ions.

4. The process of claim 1 wherein the complexing agent is one or more of ethylenediaminetetraacetic acid, diethylenetriaminepentaacetic acid, hydroxyethylethylenediaminetriacetic acid or nitriloacetic acid.

5. The process of claim 1 wherein the cation exchanger is one or more of a strong acid, a phosphonate, an iminodiacetate or a weak acid cation exchange resin.

6. The process of claim 5 wherein step (b) further comprises the presence of a strong base anion exchange resin.

7. A process for removal of metal ions from aqueous solutions that comprises:

(a) adding triethylenetetramine to an aqueous solution containing copper ions and a metal complexing agent capable of forming a metal-complex with the copper ions, the complexing agent being present in greater than equimolar amount with respect to copper ion concentration, the triethylenetetramine being added in an amount from 0.1 to 0.5 times the copper ion concentration; and (b) contacting the aqueous solution from step (a) with a strong acid cation exchange resin.

8. The process of claim 7 wherein step (b) further comprises the presence of a strong base anion exchange resin.

* * * * *